(12) United States Patent
Haussmann (10) Patent No.: US 9,573,441 B2
(45) Date of Patent: Feb. 21, 2017

(54) VEHICLE AIR CONDITIONING UNIT

(71) Applicant: VALEO KLIMASYSTEME GMBH, Bad Rodach (DE)

(72) Inventor: Roland Haussmann, Wiesloch (DE)

(73) Assignee: VALEO KLIMASYSTEME GMBH, Bad Rodach (DE)

( * ) Notice: Subject to any disclaimer, the term of this patent is extended or adjusted under 35 U.S.C. 154(b) by 91 days.

(21) Appl. No.: 14/414,906

(22) PCT Filed: Jul. 15, 2013

(86) PCT No.: PCT/EP2013/064874
§ 371 (c)(1),
(2) Date: Jan. 15, 2015

(87) PCT Pub. No.: WO2014/012873
PCT Pub. Date: Jan. 23, 2014

(65) Prior Publication Data
US 2015/0183298 A1  Jul. 2, 2015

(30) Foreign Application Priority Data

Jul. 18, 2012 (DE) .................. 10 2012 014 242

(51) Int. Cl.
*B60H 1/32* (2006.01)
*B60H 1/00* (2006.01)

(52) U.S. Cl.
CPC .......... *B60H 1/3227* (2013.01); *B60H 1/005* (2013.01); *B60H 1/3204* (2013.01)

(58) Field of Classification Search
CPC ...... B60H 1/3227; B60H 1/3204; B60H 1/005
See application file for complete search history.

(56) References Cited

U.S. PATENT DOCUMENTS 5,104,068 A * 4/1992 Krilla ................. B64F 5/0054
  134/123
2002/0088246 A1 * 7/2002 Bureau ............ B60H 1/00321
  62/434

(Continued)

FOREIGN PATENT DOCUMENTS

DE  101 40 630 A1  2/2003
DE  102 42 369 A1  3/2004

(Continued)

OTHER PUBLICATIONS

International Search Report for corresponding International Application No. PCT/EP2013/064874, mailed Nov. 19, 2013 (2 pages).

Primary Examiner — Emmanuel Duke
(74) Attorney, Agent, or Firm — Osha Liang LLP (57) ABSTRACT

A vehicle air conditioning unit having a compressor for compressing a refrigerant, a condenser for cooling and condensing the refrigerant from the compressor, a pressure-reduction unit for decompressing the refrigerant from the condenser, an evaporator for cooling air that can be supplied to a vehicle interior, and a cold store which comprises a heat exchanger, which can be used as a store evaporator, and a cold storage medium is shown. The unit includes a throttle device is provided which can reduce a refrigerant pressure in the heat exchanger of the cold store in relation to a refrigerant pressure in the evaporator.

18 Claims, 4 Drawing Sheets

(56) References Cited

U.S. PATENT DOCUMENTS

2003/0159455 A1* 8/2003 Aikawa .................. B60H 1/005
62/225
2006/0288727 A1* 12/2006 Aikawa .................. F25D 16/00
62/434

FOREIGN PATENT DOCUMENTS

DE    10 2006 028 936 A1    3/2007
FR         2 824 388 A1    11/2002

* cited by examiner

VEHICLE AIR CONDITIONING UNIT

The invention relates to a vehicle air conditioning unit having a compressor for compressing a refrigerant, a condenser for cooling and condensing the refrigerant from the compressor, a pressure-reduction unit for decompressing the refrigerant from the condenser, an evaporator for cooling air that can be supplied to a vehicle interior, and a cold store which comprises a heat exchanger, which can be used as a store evaporator, and a cold storage medium.

Vehicle air conditioning units with cold stores are already generally known from the prior art. Said cold stores permit air conditioning of the vehicle interior even after a vehicle engine, and thus the compressor driven by the vehicle engine, have been shut down.

Vehicle air conditioning systems already exist in which the cold store is integrated into the evaporator for cooling air that can be supplied to the vehicle interior. Such integrated cold store systems normally have a storage capacity in the range of approximately 50 Wh. This storage capacity is sufficient, in the case of motor vehicles with a so-called automatic start/stop system, to maintain the air conditioning of the vehicle interior during short shut-down periods of the engine (for example at railway crossings or traffic lights).

During "normal operation" of the air conditioning system, that is to say while the vehicle engine and compressor are running, the cold store integrated into the evaporator however has an adverse effect on the energy balance of the air conditioning system. Furthermore, the cold store takes up a part of the usually restricted installation space in the region of the evaporator, such that the evaporator portion itself must be of more compact design. This generally leads to small flow cross sections for the air to be conditioned, and thus to a higher speed of the airflow. An increase of the storage capacity for relatively long standstill periods of the vehicle engine would further intensify the stated negative effects, and can therefore scarcely be realized.

In particular in the case of utility vehicles, vehicle air conditioning systems are also known which have a second cooling circuit and a separate cold store. Such systems have storage capacities in the range of approximately 5000 Wh and thus permit for example air conditioning of a sleeping cab of the utility vehicle during rest periods. Said air conditioning systems however take up a large installation space, and are relatively expensive owing to the second cooling circuit.

Finally, the generic DE 10 2006 028 936 A1 describes a vehicle air conditioning system in which a separate cold store is integrated into a refrigerant circuit of the vehicle air conditioning system. This offers the advantage that the position of the cold store can be adapted to a certain extent to the respective installation space conditions. In this way, even in the case of cold stores of average storage capacity, fewer installation space problems are encountered as with the integrated cold stores mentioned above. Since the proposed vehicle air conditioning system furthermore makes do with only one refrigerant circuit, the manufacturing costs are considerably lower in relation to the above-mentioned air conditioning systems with two cooling circuits.

In DE 10 2006 028 936 A1, the cold store is arranged downstream of the evaporator in the refrigerant circuit. Since the cold store is constantly traversed by a flow of the refrigerant during the operation of the air conditioning system, the flow resistance of the cold store has an adverse effect on the energy balance of the vehicle air conditioning system in particular during normal operation. In order that adequate cooling of the vehicle interior is ensured when the vehicle engine and/or compressor are shut down, the phase transition temperature of the cold storage medium should not be too high. If only a low level of cooling power is demanded at the evaporator for cooling the air that can be supplied to the vehicle interior, the air conditioning system must under some circumstances nevertheless impart an increased cooling action in order to charge the cold store or keep the cold store in the charge state. This likewise has an adverse effect on the energy balance of the air conditioning system, in particular if, owing to the increased cooling power, the air that can be supplied to the vehicle interior must be re-heated again.

It is an object of the invention to provide a particularly energy-efficient air conditioning system having a cold store which preferably has an average storage capacity in the range of approximately 400 Wh.

According to the invention, said object is achieved by means of an air-conditioning system of the type specified in the introduction, in which a throttle device is provided which can reduce a refrigerant pressure in the heat exchanger of the cold store in relation to a refrigerant pressure in the evaporator. By means of the throttle device, it is possible, even when using a cold storage medium with a low phase transition temperature, to charge the cold store without the air that can be supplied to the vehicle interior being cooled to an undesirably great extent at the evaporator.

In one embodiment of the vehicle air conditioning system, the evaporator and the cold store are connected in parallel in a refrigerant circuit, wherein the throttle device is arranged in an evaporator branch line of the refrigerant, downstream of the evaporator. With such a parallel connection of the evaporator and of the cold store, it is possible for the branch line of the cold store to be opened up only for the charging or discharging of the cold store with little technical outlay, such that the cold store does not influence the "normal operation" of the vehicle air conditioning system.

In an alternative embodiment of the vehicle air conditioning system, the evaporator and the cold store are connected in series in a refrigerant circuit, wherein the cold store is arranged downstream of the evaporator.

Here, the throttle device is preferably provided between the evaporator and the cold store.

Furthermore, it may be provided that, between the evaporator and the cold store, a bypass line branches off which opens into the refrigerant circuit again downstream of the cold store. By means of said bypass line, the cold store can be bypassed during normal operation of the vehicle air conditioning system, which in turn has a positive effect on the energy efficiency of the air conditioning system.

A valve unit for the throughflow control is preferably provided on a branch of the bypass line between the evaporator and the cold store. Said valve unit is for example a 3-way valve which can, with little outlay, conduct the refrigerant flow selectively via the bypass line or via the cold store.

Here, the throttle device may in particular be integrated into the valve unit. This contributes to a particularly compact design of the vehicle air conditioning system.

If the evaporator and the cold store are connected in series, it is preferable for a return line to be provided which can conduct refrigerant from downstream of the cold store to upstream of the evaporator. If the cold store is discharged while the compressor is deactivated, the return line permits a circulation, which is advantageous from an energy aspect, of refrigerant between the cold store and the evaporator.

In a further embodiment of the vehicle air conditioning system, the throttle device is assigned to a suction side of the compressor. In this way, by means of the throttle, it is possible in a simple manner for a refrigerant pressure at the evaporator to be increased if the air that can be supplied to the vehicle interior is to be cooled only slightly.

To be able to adapt the vehicle air conditioning system in as energy-efficient a manner as possible in its different load situations, the throttle device is preferably in the form of a switchable throttle valve with variable throughflow cross section. For example, during normal operation of the vehicle air conditioning system, a maximum throughflow cross section may be set for energy efficiency reasons, whereas during cold store charging operation, a small throughflow cross section is selected in order to ensure a high level of cooling power in the cold store.

The cold storage medium of the vehicle air conditioning system is for example a water mixture, and preferably has a water fraction of at least 50%. The use of a water mixture as a cold storage medium is extremely cost-effective, in particular in relation to alternative cold storage media such as, for example, paraffin.

The cold storage medium of the vehicle air conditioning system is particularly preferably a water/glycol mixture, wherein the glycol fraction is between 1% and 50%, in particular between 2% and 20%. Such a mixture is firstly particularly cheap, and secondly has a phase transition temperature between approximately 0° C. and −10° C. Such a low phase transition temperature of the cold storage medium is particularly desirable in order to attain a satisfactory cooling power during cold store discharging operation when the compressor and/or vehicle engine are shut down. Owing to the throttle device, it is possible without problems to generate refrigerant temperatures which, even in the case of such a low phase transition temperature, ensure a phase transition of the cold storage medium from "liquid" to "solid".

The evaporator and the heat exchanger, which can be used as a store evaporator, of the cold store may be of substantially identical construction. This considerably reduces the costs for the cold store because the store evaporator, which is required in relatively small unit quantities, need not be produced as a specially manufactured product. A "standard" heat exchanger, such as is used as an evaporator for cooling the air that can be supplied to the vehicle interior, is by contrast manufactured in very large unit quantities, and is accordingly available at low cost.

In the return line there is preferably provided an electric pump which can generate a defined circulation of refrigerant between the cold store and the evaporator. By means of a suitable control device of the electric pump, a desired level of cooling power can be set at the evaporator with little outlay.

The cold store preferably has a tank which accommodates the heat exchanger and the cold store medium and which is sealed off with respect to the environment. The cold store thus comprises substantially a "standard" heat exchanger, a cost-effective cold storage medium and a tank which is sealed off in a simple manner. Together with the throttle device and further optional hydraulic components, it is possible for a conventional vehicle air conditioning system without a cold store to be expanded, with little additional outlay, to form a vehicle air conditioning system with separate cold store, without the energy efficiency being significantly impaired, in particular during normal operation of the vehicle air conditioning system. The compressor is particularly advantageously also used for the breaking of the motor vehicle, such that for example an increased compressor power for charging the cold store need not be imparted by the drive power of the vehicle engine. This has an additionally positive effect on the overall energy balance of the vehicle air conditioning system.

Further features and advantages of the invention will emerge from the following description of preferred embodiments with reference to the drawings, in which.

FIGS. 1 to 6 show in each case a vehicle air conditioning system 10, in particular for utility vehicles, having a compressor 12 for compressing a refrigerant 14, a condenser 16 for cooling and condensing the refrigerant 14 from the compressor 12, a pressure-reduction unit 18 for decompressing the refrigerant 14 from the condenser 16, an evaporator 20 for cooling air 22 that can be supplied to a vehicle interior, and a cold store which comprises a heat exchanger 26, which can be used as a store evaporator, and a cold storage medium 28. In addition, a throttle device 30 is provided which can reduce a refrigerant pressure in the heat exchanger 26 of the cold store 24 in relation to a refrigerant pressure in the evaporator 20.

Figure 1:
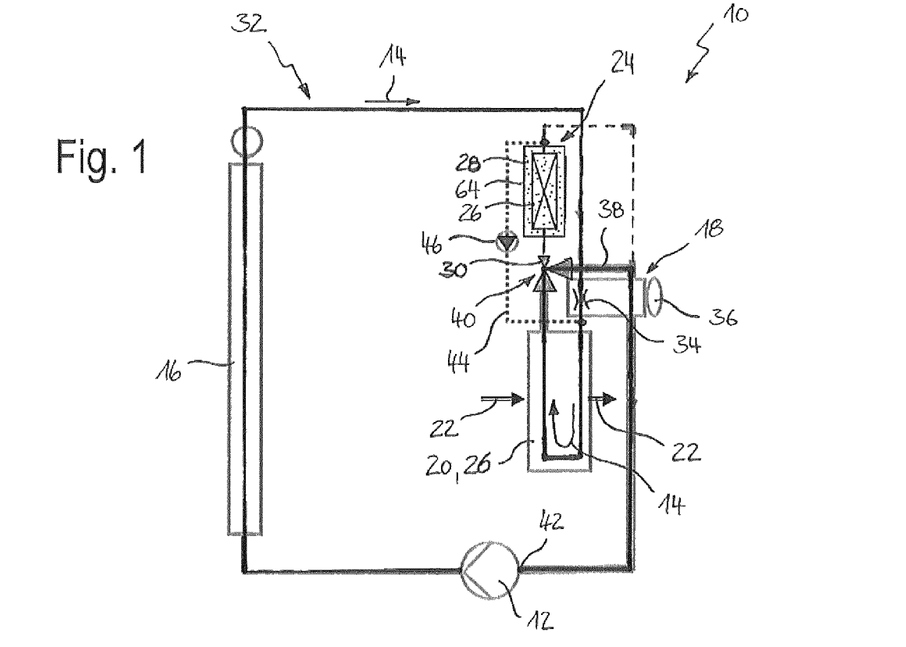
FIG. 1 is a diagrammatic sketch of a vehicle air conditioning system according to the invention as per a first embodiment, during normal operation.
Figure 2:
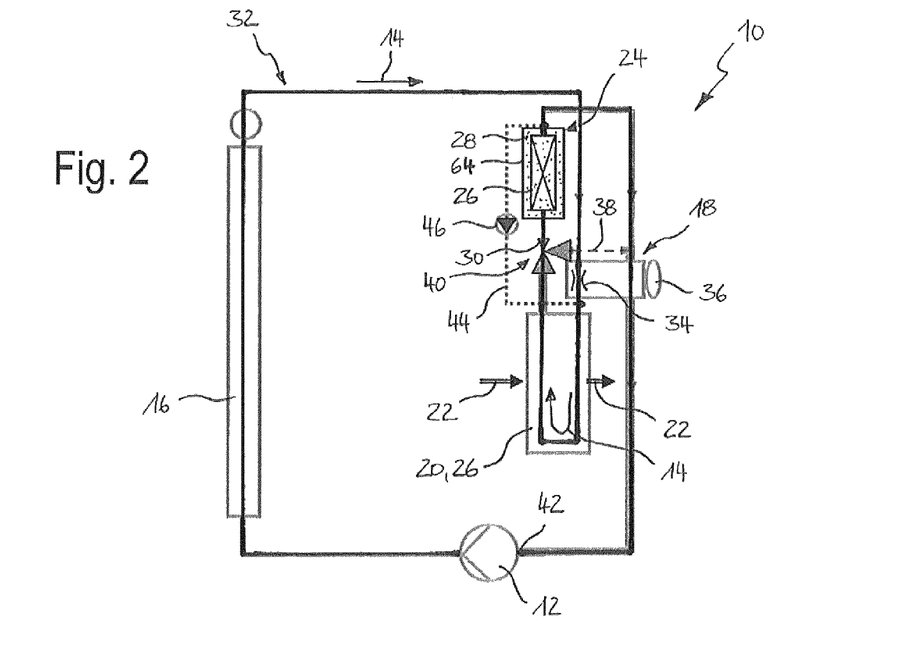
FIG. 2 is the schematic sketch of the vehicle air conditioning system as per FIG. 1, during cold store charging operation.
Figure 3:
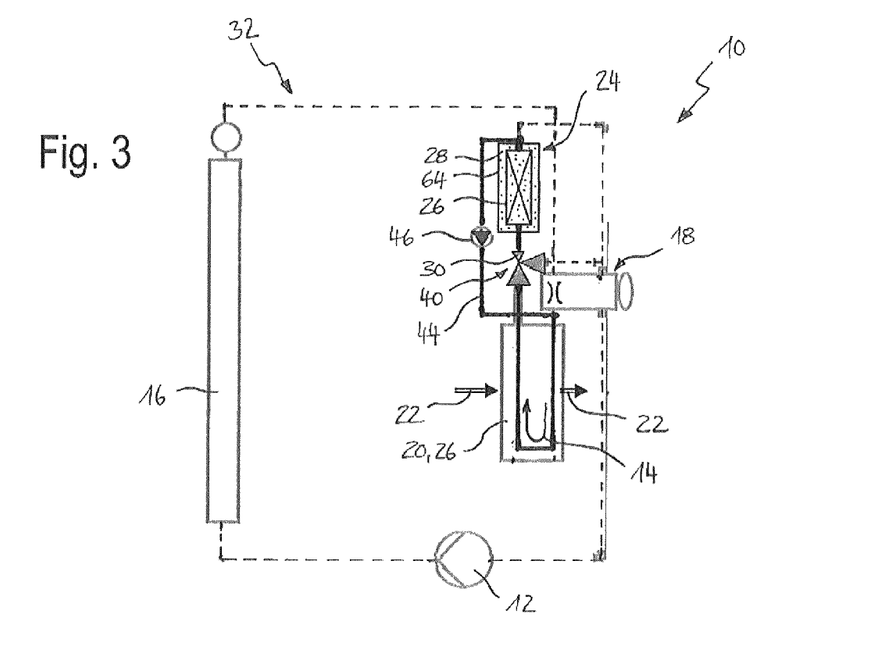
FIG. 3 is the schematic sketch of the vehicle air conditioning system as per FIG. 1, during cold store discharging operation.

FIGS. 1 to 3 illustrates a first embodiment of the vehicle air conditioning system 10, in which the evaporator 20 and the cold store 24 are connected in series in a refrigerant circuit 32 of the air conditioning system 10, wherein the cold store 24 is arranged downstream of the evaporator 20.

FIG. 1 shows the first embodiment of the vehicle air conditioning system 10 during so-called "normal operation", during which the vehicle air conditioning system 10 is activated but neither charging nor discharging of the cold store 24 takes place. A flow path of the refrigerant 14 in a refrigerant circuit 32 is plotted here as a thick solid line. During normal operation of the air conditioning system 10, a vehicle engine drives the compressor 12 in the refrigerant circuit 32. The high-temperature and high-pressure refrigerant 14 emerging from the compressor 12 flows into the condenser 16, which is a high-pressure heat exchanger 26. In the condenser 16, the high-temperature and high-pressure refrigerant 14 is in heat-exchanging contact with the outside air which is blown by a cooling fan (not illustrated), said refrigerant being condensed by cooling. The cooled refrigerant 14 is subsequently decompressed by the pressure-reduction unit 18. The pressure-reduction unit 18 is for example an expansion valve, in particular a thermal expansion valve of conventional type, which has a throttle portion 34 and a sensor portion 36. At the throttle portion 34, a refrigerant throughflow is set as a function of data, in particular temperature data, recorded downstream of the evaporator 20 in the sensor portion 36. The liquid refrigerant 14 thereafter evaporates in the evaporator 20, and in so doing cools the air 22 that can be supplied to the vehicle interior. The now-gaseous refrigerant 14 is subsequently sucked in by the compressor 12 and compressed again. Said normal operation of the vehicle air conditioning system 10 has already been described in detail in the prior art, for which reason further design details are omitted here.

Between the evaporator 20 and the cold store 24, a bypass line 38 branches off which opens into the refrigerant circuit 32 again downstream of the cold store 24. A valve unit 40 for throughflow control is provided on a branch of the bypass line 38 between the evaporator 20 and the cold store 24. Said valve unit 40 is for example a 3-way valve which, during normal operation of the vehicle air conditioning system 10, conducts the refrigerant 14 via the bypass line 38 to the compressor 12, bypassing the cold store 24. The flow path of the refrigerant 14 during normal operation of the vehicle air conditioning system 10 thus does not differ from the flow path in a conventional vehicle air conditioning system without a cold store 24.

FIG. 2 shows the vehicle air conditioning system 10 during so-called cold store charging operation, wherein the flow path of the refrigerant 14 is again illustrated as a thick solid line. During cold store charging operation, the air conditioning of the vehicle interior takes place exactly as during normal operation as per FIG. 1. The vehicle engine drives the compressor 12, wherein the compressor 12 demands increased power in relation to normal operation in order to be able to additionally charge the cold store 24.

Instead of dissipating excess kinetic energy of the vehicle as waste heat via a brake system, said energy can be at least partially utilized for driving the compressor 12. Owing to the increased power demand of the compressor 12 during the charging of the cold store, it is particularly efficient for the cold store charging operation of the vehicle air conditioning system 10 to be activated when the vehicle is to be braked. This type of energy recovery is also referred to as "regenerative braking" and can be advantageously implemented in particular in vehicle air conditioning systems 10 of utility vehicles.

During cold store charging operation, the valve unit 40 blocks the bypass line 38 and conducts the refrigerant 14 back to the compressor 12 via the cold store 24.

In the exemplary embodiment as per FIGS. 1 to 3, the throttle device 30 is arranged between the evaporator 20 and the cold store 24, and is integrated into the valve unit 40. The throttle device 30 is assigned to a suction side 42 of the compressor 12, and thus, during cold store charging operation, ensures that a refrigerant pressure in the heat exchanger 26 of the cold store 24 lies below a refrigerant pressure in the evaporator 20 by a settable pressure difference.

If the throttle device 30 is in the form of a single throttle with a fixed throttle cross section, the throttle cross section is preferably selected such that a pressure drop of 0.5-2.0 bar, in particular of 0.8-1.2 bar prevails across the throttle device 30.

To improve the energy efficiency of the vehicle air conditioning system 10, the throttle device 30 is however preferably in the form of a switchable throttle valve with variable throughflow cross section.

FIG. 3 shows the first embodiment of the vehicle air conditioning system 10 during so-called cold store discharging operation, wherein the flow path of the refrigerant 14 is again illustrated as a thick solid line. If the vehicle engine and thus the compressor 12 are shut down, the vehicle air conditioning system 10 switches into cold store discharging operation in order to maintain the air conditioning of the vehicle interior. In this operating state, the refrigerant 14 which flows into the heat exchanger 26 of the cold store 24 in the gaseous state is cooled and liquefied. The dissipated heat is absorbed by the cold storage medium 28 which thereby "thaws", that is to say undergoes a phase change from solid to liquid. The liquid refrigerant 14 subsequently evaporates in the evaporator 20, and in so doing extracts heat energy from the air 22 that can be supplied to the vehicle interior, such that the air 22 cools. The now-gaseous refrigerant 14 is then supplied to the cold store 24 again.

As per FIG. 3, the refrigerant circuit 32 of the vehicle air conditioning system 10 has, for said operating state, a return line 44 which can conduct refrigerant 14 from downstream of the cold store 24 to upstream of the evaporator 20. In said return line 44 there is also provided an electric pump 46 which, during cold store discharging operation, generates a circulation of refrigerant 14 between the cold store 24 and the evaporator 20. Through suitable actuation of the electric pump 46, a desired level of cooling power can be set at the evaporator 20, such that the air 22 supplied to the vehicle interior is at a desired temperature.

If the throttle device 30 is in the form of a switchable throttle valve with variable throughflow cross section, a desired level of cooling power at the evaporator 20 can also be influenced by means of the throughflow cross section of the throttle device 30.

Figure 4:
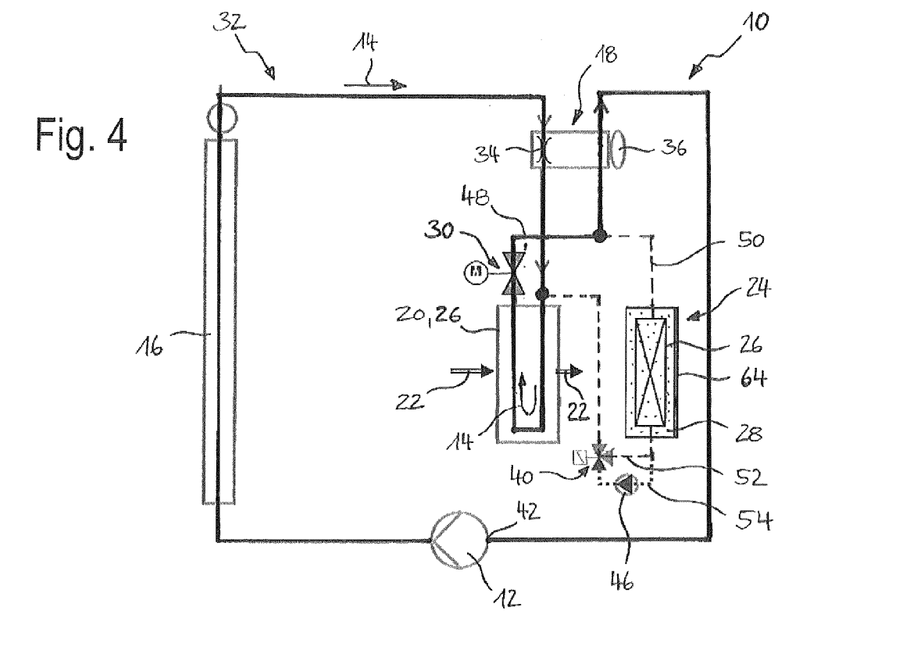
FIG. 4 is a schematic sketch of a vehicle air conditioning system according to the invention as per a second embodiment, during normal operation.
Figure 5:
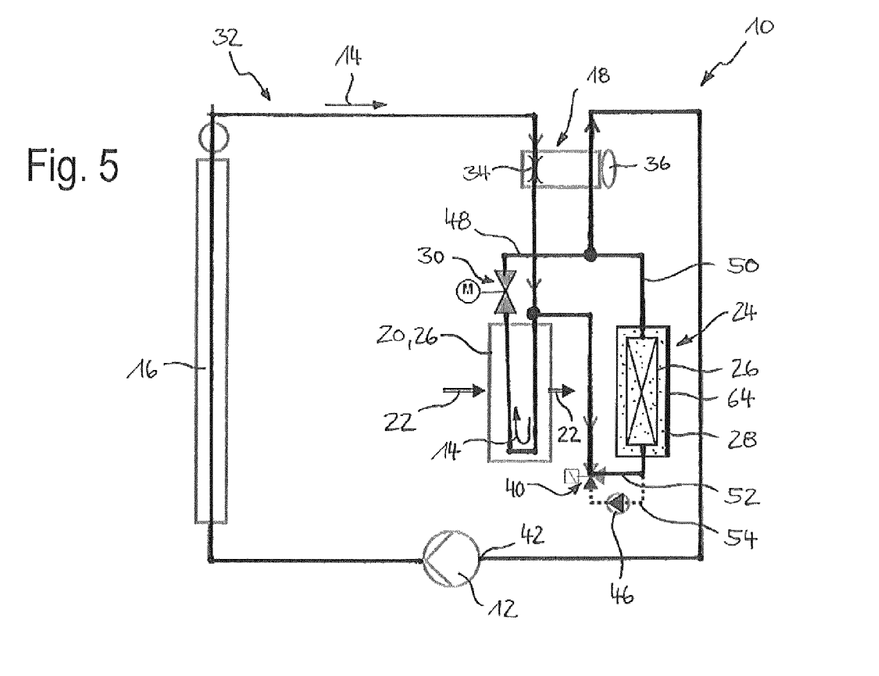
FIG. 5 is the schematic sketch of the vehicle air conditioning system as per FIG. 4, during cold store charging operation.
Figure 6:
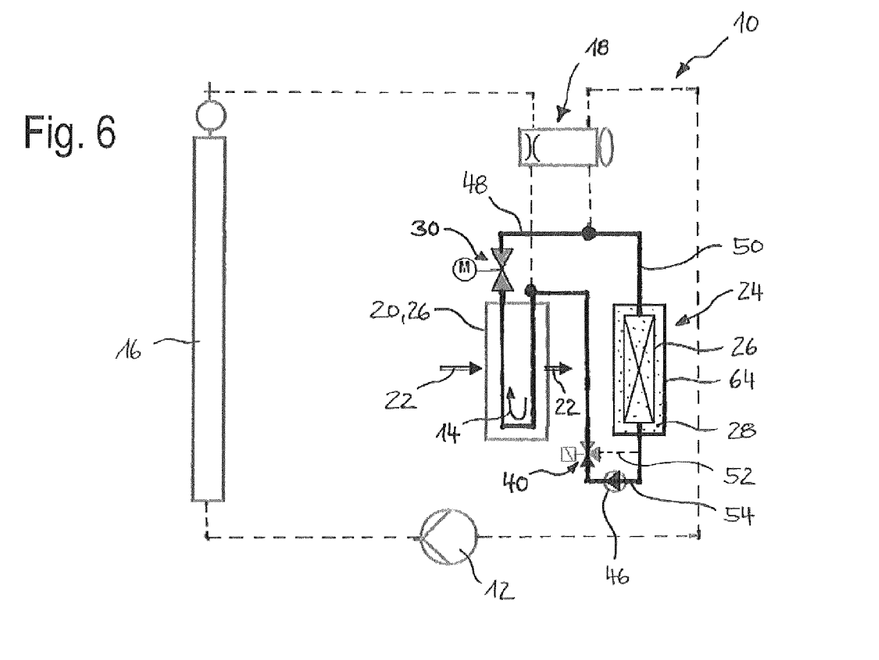
FIG. 6 is the schematic sketch of the vehicle air conditioning system as per FIG. 4, during cold store discharging operation.

FIGS. 4 to 6 show a second embodiment of the vehicle air conditioning system 10 which, with regard to its basic mode of operation, does not differ from the first embodiment of the vehicle air conditioning system 10, such that in this regard, reference is made explicitly to the description relating to FIGS. 1 to 3, and only the differences will be discussed below.

By contrast to FIGS. 1 to 3, it is the case in the vehicle air conditioning system 10 as per FIGS. 4 to 6 that the evaporator 20 and the cold store 24 are connected in parallel in the refrigerant circuit 32, wherein the throttle device 30 is arranged in an evaporator branch line 48 of the refrigerant 14, downstream of the evaporator 20.

FIG. 4 shows, analogously to FIG. 1, the normal operation of the vehicle air conditioning system 10.

In a cold store branch line 50 of the parallel-connection configuration, there is provided a valve unit 40 which, analogously to the first embodiment of the vehicle air conditioning system 10, is preferably in the form of a 3-way valve. During normal operation as per FIG. 4, the valve unit 40 blocks the cold store branch line 50, such that the refrigerant 14 flows via the evaporator branch line 48 to the suction side 42 of the compressor 12, bypassing the cold store 24.

In this second embodiment of the vehicle air conditioning system 10, for reasons of energy efficiency, the throttle device 30 which is assigned to the suction side 42 of the compressor 12 is particularly preferably in the form of a switchable throttle valve with variable throughflow cross section. The throughflow cross section can thus be selected to be so large during normal operation of the vehicle air conditioning system 10 that the throttle device 30 no longer constitutes a significant flow resistance. The throttle function is, in other words, "deactivated".

If, by contrast, the throttle device 30 is in the form of a single throttle with fixed throughflow cross section, the compressor 12 must impart increased power during normal operation, which has an adverse effect on the energy balance of the vehicle air conditioning system 10.

FIG. 5 shows, analogously to FIG. 2, cold store charging operation of the vehicle air conditioning system 10.

In this case, the valve unit 40 opens up the cold store branch line 50, such that a part of the refrigerant 14 flows via the evaporator branch line 48 through the evaporator 20, and the rest of the refrigerant 14 flows via the cold store branch line 50 through the heat exchanger 26 of the cold store 24.

During cold store charging operation of the vehicle air conditioning system 10, the throttle device 30 has the effect that a refrigerant pressure in the heat exchanger 26 of the cold store 24 lies below a refrigerant pressure in the evaporator 20 by a predeterminable pressure difference. The pressure difference amounts to for example 0.5-2.0 bar, in particular 0.8-1.2 bar.

FIG. 6 shows, analogously to FIG. 3, cold store discharging operation of the vehicle air conditioning system 10.

In this case, the valve unit 40 closes a pump bypass portion 52 of the cold store branch line 50, and instead opens up a pump portion 54 of the cold store branch line 50.

Provided in the cold store branch line 50, specifically in the pump portion 54 of the cold store branch line 50, is the electric pump 46 which, during cold store discharging operation, generates a circulation of refrigerant 14 between the cold store 24 and the evaporator 20.

Analogously to the first embodiment of the vehicle air conditioning system 10, it is possible, through suitable actuation of the electric pump 46 and/or an adaptation of the throughflow cross section of the throttle device 30, to set a desired level of cooling power at the evaporator 20, such that the air 22 that can be supplied to the vehicle interior is cooled to a desired temperature.

Figure 7:
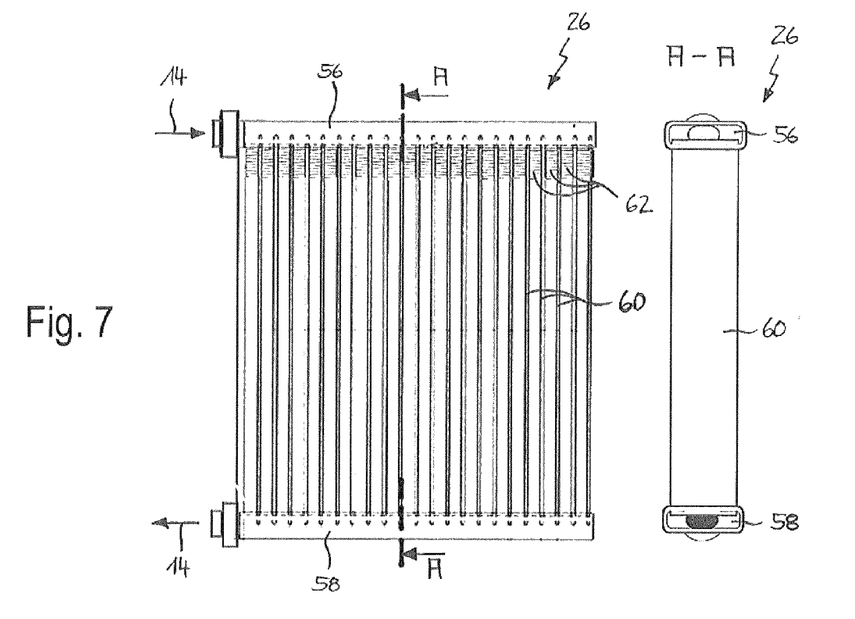
FIG. 7 is a schematic side view and a section A-A of a heat exchanger for a vehicle air conditioning system according to the invention.

FIG. 7 shows a side view and a section A-A of the heat exchanger 26 for the vehicle air conditioning system 10 as per FIGS. 1 to 6.

The heat exchanger 26 is a conventional high-pressure heat exchanger having a collecting line 56 for the supply of refrigerant 14 and having a collecting line 58 for the discharge of refrigerant 14, wherein the collecting lines 56, 58 are connected via multiple spaced-apart flat lines 60. Heat-conducting fins 62 are provided in each case between two adjacent flat lines 60 in order to improve the heat transfer between the refrigerant 14 on the one hand and the air 22 or the cold storage medium 28 on the other hand.

The heat exchanger 26 illustrated in FIG. 7 may be of substantially identical construction to the evaporator 20 for cooling air 22 that can be supplied to the vehicle interior, and may also be used as a storage evaporator in the cold store 24. Through the use of a conventional heat exchanger 26 for the cold store 24, it is possible for the production costs for the vehicle air conditioning system 10 to be considerably reduced.

As refrigerant 14, use may be made, for example, of R744 (carbon dioxide), HFO-1234yf or some other refrigerant which is suitable for vehicle air conditioning systems 10.

The cold storage medium 28, by contrast, is preferably a water mixture with a water fraction of at least 50%. The cold storage medium is particularly preferably a water/glycol mixture in which the glycol fraction is between 1% and 50%, in particular between 2% and 20%. Other cold storage media such as paraffin may likewise be used, but are generally considerably more expensive than the described water mixtures. Furthermore, the phase transition temperature from liquid to solid in the case of a water/glycol mixture with a glycol fraction of between 2% and 20% is in the range between 0° C. and −10° C. A phase transition temperature in this range ensures a satisfactory level of cooling power during cold store discharging operation. Furthermore, the refrigerant temperature can be reduced by means of the throttle device 30 to such an extent that the cold storage medium 28 can be easily changed into a solid or at least partially solid phase during cold store charging operation.

Figure 8:
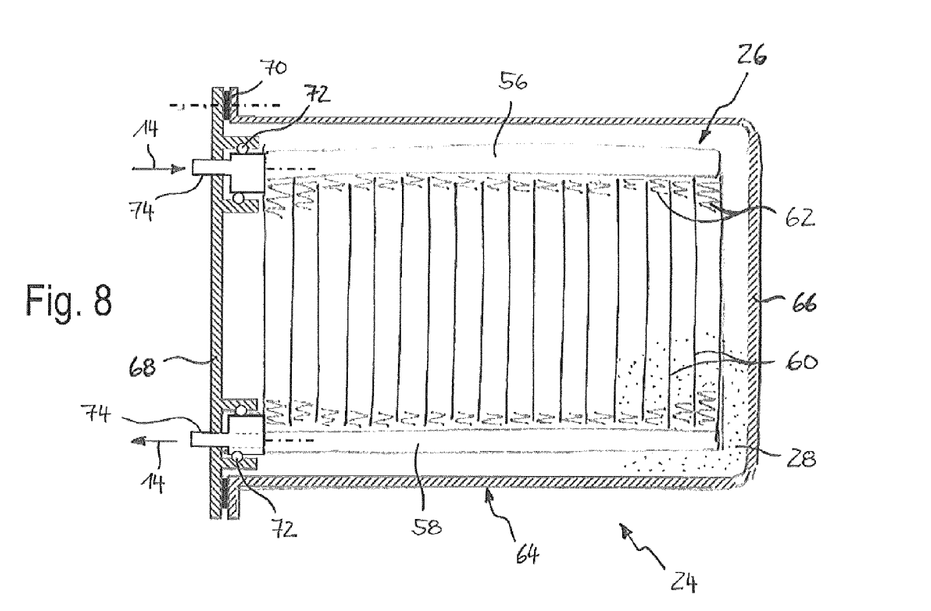
FIG. 8 is a schematic section through a cold store for a vehicle air conditioning system according to invention, having a heat exchanger as per FIG. 7.

FIG. 8 shows the cold store 24 for the vehicle air conditioning system 10 as per FIGS. 1 to 6, having a heat exchanger 26 as per FIG. 7. The cold store 24 has a tank 64 which accommodates the heat exchanger 26 and the cold storage medium 28 and which is sealed off with respect to the environment by means of seals 70, 72. Since the cold storage medium 28 is normally only at atmospheric pressure, the tank 64 is preferably manufactured from plastic. For example, the tank 64 comprises a vessel 66 composed of plastic, said vessel being closed off in a sealed manner by means of a cover 68 composed of plastic, wherein connections 74 for the collecting lines 56, 58 project in a sealed manner through the cover 68.

If use is made of a water/glycol mixture as cold storage medium 28, "ice slush" firstly forms as the temperature falls, which ice slush generates only relatively low stresses in the tank 64 during the phase transition. Depending on the glycol fraction, an ice block which is solid throughout forms only at very low temperatures. With the selection of a suitable plastic, certain changes in volume during the phase transition of the cold storage medium 28 may furthermore also be compensated by means of a certain degree of flexibility of the plastics tank 64. Finally, it is also conceivable for the tank 64 to not be filled completely with cold storage medium 28, such that the stresses generated in the tank 64 during the phase transition of the cold storage medium 28 are kept low.

The invention claimed is:

1. Vehicle air conditioning unit comprising:
    a compressor for compressing a refrigerant,
    a condenser for cooling and condensing the refrigerant from the compressor,
    a pressure-reduction unit for decompressing the refrigerant from the condenser,
    an evaporator for cooling air that can be supplied to a vehicle interior, and
    a cold store which comprises a heat exchanger, which can be used as a store evaporator, and a cold storage medium,
    wherein a throttle device is provided which can reduce a refrigerant pressure in the heat exchanger of the cold store in relation to a refrigerant pressure in the evaporator,
    wherein the evaporator and the cold store are connected in series in a refrigerant circuit,
    wherein the cold store is arranged downstream of the evaporator, and
    wherein, between the evaporator and the cold store, a bypass line branches of which opens into the refrigerant circuit again downstream of the cold store.

2. Vehicle air conditioning unit according to claim 1, wherein the evaporator and the cold store are connected in parallel in a refrigerant circuit, wherein the throttle device is arranged in an evaporator branch line of the refrigerant, downstream of the evaporator.

3. Vehicle air conditioning unit according to claim 1, wherein the throttle device is arranged between the evaporator and the cold store.

4. Vehicle air conditioning unit according to claim 3, wherein, between the evaporator and the cold store, a bypass line branches off which opens into the refrigerant circuit again downstream of the cold store.

5. Vehicle air conditioning unit according to claim 3, wherein a return line is provided which can conduct refrigerant from downstream of the cold store to upstream of the evaporator.

6. Vehicle air conditioning unit according to claim 1, wherein a valve unit for throughflow control is provided on a branch of the bypass line between the evaporator and the cold store.

7. Vehicle air conditioning unit according to claim 6, wherein the throttle device is integrated into the valve unit.

8. Vehicle air conditioning unit according to claim 7, wherein a return line is provided which can conduct refrigerant from downstream of the cold store to upstream of the evaporator.

9. Vehicle air conditioning unit according to claim 6, wherein a return line is provided which can conduct refrigerant from downstream of the cold store to upstream of the evaporator.

10. Vehicle air conditioning unit according to claim 1, wherein a return line is provided which can conduct refrigerant from downstream of the cold store to upstream of the evaporator.

11. Vehicle air conditioning unit according to claim 1, wherein the throttle device is assigned to a suction side of the compressor.

12. Vehicle air conditioning unit according to claim 1, wherein the throttle device is in the form of a switchable throttle valve with variable throughflow cross section.

13. Vehicle air conditioning unit according to claim 12, wherein the cold storage medium is a water/glycol mixture, and the glycol fraction is between 1% and 50%, preferably between 2% and 20%.

14. Vehicle air conditioning unit according to claim 1, wherein the cold storage medium is a water mixture, and preferably has a water fraction of at least 50%.

15. Vehicle air conditioning unit according to claim 1, wherein the evaporator and the heat exchanger, which can be used as a store evaporator, are of identical construction.

16. Vehicle air conditioning unit according to claim 1, wherein an electric pump is provided which can generate a defined circulation of refrigerant between the cold store and the evaporator.

17. Vehicle air conditioning unit according to claim 1, wherein the cold store has a tank which accommodates the heat exchanger and the cold storage medium and which is sealed off with respect to the environment.

18. Vehicle air conditioning unit according to claim 1, wherein a return line is provided which can conduct refrigerant from downstream of the cold store to upstream of the evaporator.

* * * * *